March 11, 1941.  M. H. GRAHAM  2,234,759
AUTOMATIC TOASTER
Filed Nov. 11, 1937   6 Sheets-Sheet 1

Fig. 1

INVENTOR
Maurice H. Graham
By His Attorneys
Merchant & Merchant

March 11, 1941.    M. H. GRAHAM    2,234,759
AUTOMATIC TOASTER
Filed Nov. 11, 1937    6 Sheets-Sheet 2

INVENTOR
Maurice H. Graham
By his Attorneys
Merchant & Merchant

March 11, 1941.    M. H. GRAHAM    2,234,759
AUTOMATIC TOASTER
Filed Nov. 11, 1937    6 Sheets-Sheet 4

INVENTOR
Maurice H. Graham
By his Attorneys

March 11, 1941. M. H. GRAHAM 2,234,759
AUTOMATIC TOASTER
Filed Nov. 11, 1937 6 Sheets-Sheet 5

INVENTOR
Maurice H. Graham
By his Attorneys

Patented Mar. 11, 1941

2,234,759

UNITED STATES PATENT OFFICE 2,234,759

AUTOMATIC TOASTER

Maurice H. Graham, St. Louis Park, Minn., assignor to McGraw Electric Company, Chicago, Ill., a corporation of Delaware Application November 11, 1937, Serial No. 173,962

23 Claims. (Cl. 219—19)

Broadly, my present invention relates to automatically regulated cooking apparatus but primarily and particularly the invention is directed to the apparatus generally designated as automatic bread toasters. This invention is in the nature of an improvement on or a modification of the apparatus disclosed and broadly claimed in my pending application Serial No. 4,899, filed September 4, 1935, and entitled "Timed cooker."

One of the important control elements of the apparatus of my said prior patent application was a thermally responsive expansible and contractible control element and this control element, in certain combinations, was broadly claimed but the elements specifically illustrated in the drawings was an endwise expansible and contractible bar as distinguished from a bi-metallic strip or warp bar. For certain reasons, that will hereinafter appear, the bi-metallic strip or warp bar, in the combinations claimed, is more desirable and produces better results than the endwise expansible element; and certain of the claims in this application are directed to the use in the combinations claimed of the bi-metallic strip or warp bar.

The present invention, however, involves other highly important novel features that are not limited to the use of a bi-metallic strip as the controlling element. One of these features considered broadly new and herein broadly claimed is a self-contained control unit, the parts of which are assembled on their own supplemental frame with the co-operating elements thereof in predetermined adjustment, so that when this supplemental frame is applied to the main frame of the toaster or cooker, all that is required to render the apparatus operative is the proper attachment of certain circuit connections.

The above and other features of novelty will appear in the description of the apparatus illustrated in the drawings and which illustrated apparatus is directed to a commercially successful and operative bread toaster.

Referring to these drawings wherein like characters indicate like parts throughout the several views.

Wiring diagram

Figure 17:
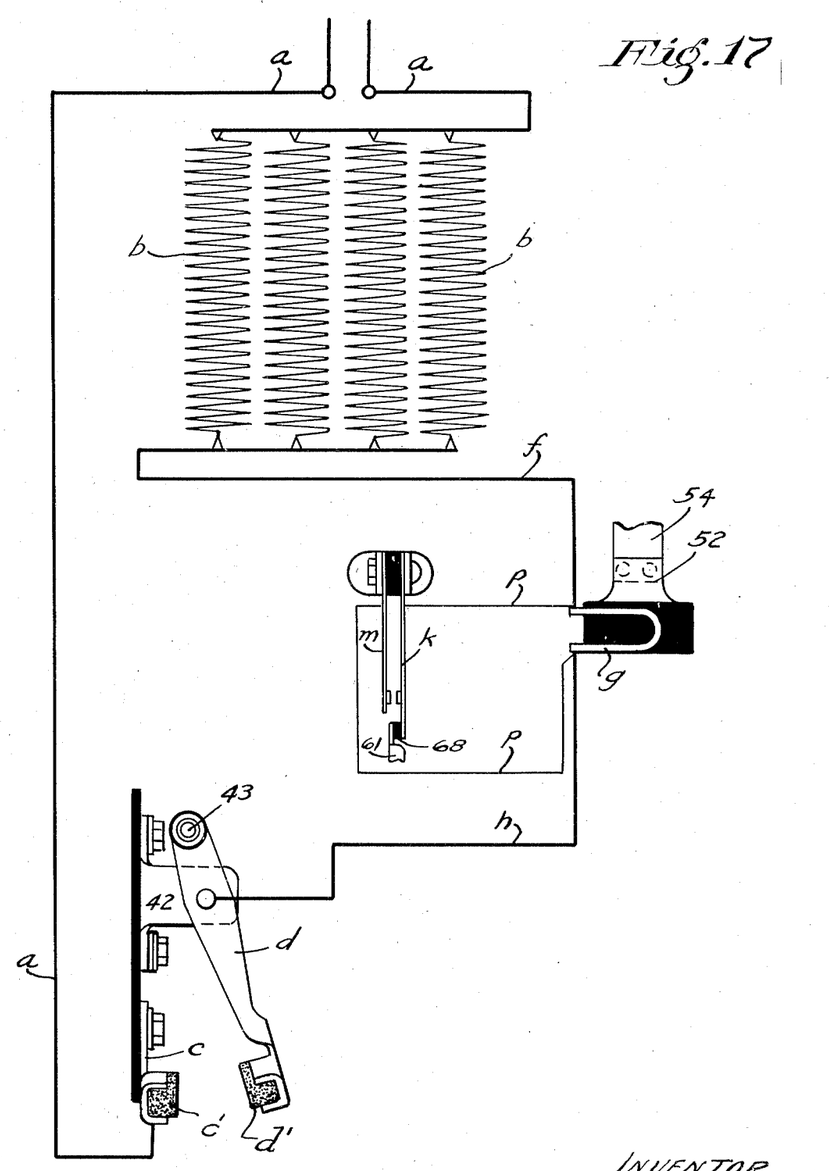
Fig. 17 is a wiring diagram of the electrical connections of the apparatus.

Before describing the mechanism of the improved toaster, attention is called to Fig. 17 which illustrates the electrical wiring scheme including circuits, electrical heating elements, and switches. In this scheme the lead or supply wires $a$ are connected, one to the main electrical heating elements $b$, and the other to one of the contacts $c$ of a master switch, the movable element of which is indicated by the letter $d$. The main coils or electrical heating elements $b$, by wire $f$, are connected to one terminal of a minor or secondary heating element $g$, the other terminal of which is connected by a wire $h$ to the movable member $d$ of the master switch.

The characters $k$ and $m$ indicate parts of a normally open shunting switch. The contacts $m$ and $k$ are located in a shunt circuit $p$ connected to the wires $f$ and $h$ on opposite sides of the minor or secondary heating element $g$. The electrical resistance of secondary heating element $g$ is much less than that of the main heating elements $b$, but is materially greater than the resistance through the shunt circuit $p$ including the shunting switch $m$ and $k$.

With the arrangement described, it is desirable at this time to call attention only to the following facts: When master switch $c$—$d$ is closed and shunting switch $m$ and $k$ is open and the current is turned on to leads $a$, the flow will be through the main heating elements $b$ and through the minor or secondary heating element $g$. When, however, the circuit is still closed through the master switch and the shunting switch $m$ and $k$ is then closed, the flow will be through the main heating elements $b$ and through the shunt circuit $p$ and the flow through heating element $g$ will then be nil or have substantially the same effect as if the current through the said element $g$ were entirely cut off. It therefore follows that heating element $g$ will cool off while the current is still active through the main heating elements and that the current will continue to flow through the main heating elements $b$ until the master switch $c$—$d$ is opened.

The automatic means whereby the above noted control of the circuits is accomplished will appear in the description of the operation of the improved apparatus.

To prepare the reader for the more detailed description of the operation to be hereinafter given, it may be stated that the complete toasting or cooking interval, in common with the broadly claimed structure of my prior application above identified, is made up of two sub-intervals herein designated as sub-interval A and sub-interval B. The first or sub-interval A is the length of time after the master switch $c$—$d$ is closed to the time that the shunt switch $m$—$k$ is closed and during which time current is applied not only to the main heating elements $b$ but to the minor heating element $g$; and the second or sub-interval B is the length of time after shunt switch $m$—$k$ is closed to the time when the master switch $c$—$d$ is closed and during which sub-interval B the element $g$ is permitted to cool while current is still applied to the elements $b$.

Toaster structure

The automatic thermally-responsive control elements for regulating operations of the two switches noted, whereby the two sub-intervals referred to are carried out or performed, by means hereinafter fully described and which means, as one of the important features of this invention, are incorporated in the self-contained control unit already referred to.

Referring now to the structure illustrated in Figs. 1 to 16, inclusive, it may be stated that in this embodiment of the invention the toaster has very much the appearance of what is well-known to the trade as the "Toastmaster toaster," but differs therefrom materially in vital structural features, as will presently appear.

As here illustrated, the base portion of the toaster is made up of a raised base plate 20 and a leg or lug-equipped under structure 21. Rigidly secured on and rising from the base plate 20 is a frame made up of upright front and rear plates 22 and 23 that support laterally spaced insulating sheets 24, preferably of mica, and on which latter the main heating coils or elements $b$ are applied. Detachably mounted on the base plate 20 and enclosing the various parts of the toaster is a casing 25, preferably of light sheet metal, which has the customary openings in its top for the entrance and discharge of toast. Spanning the upper portion of the toasting chamber, and shown as applied to the tops of the mica sheets 24, are crown sheets 26 formed with toast passages 27 that align with the toast passages, (not shown), in the top of the casing and support depending guide rods 28 that hold the toast away from the heating elements $b$.

The toaster here illustrated is designed for the simultaneous toasting of two slices of bread, but the control of the toasting action for both toasting chambers is accomplished by a common control unit. Also, the placing of the bread in the toasting position within the toasting chambers and the discharge thereof is performed by vertically movable carriers connected for common movements.

Located in front of the respective toasting chamber, forward of the front plate 22, is a pair of upright guide posts 29 rigidly secured at their lower ends to the forward portion of the base plate 20, and at their tops, rigidly secured to brackets 30 projected forward from the crown plates 26.

Figure 4:
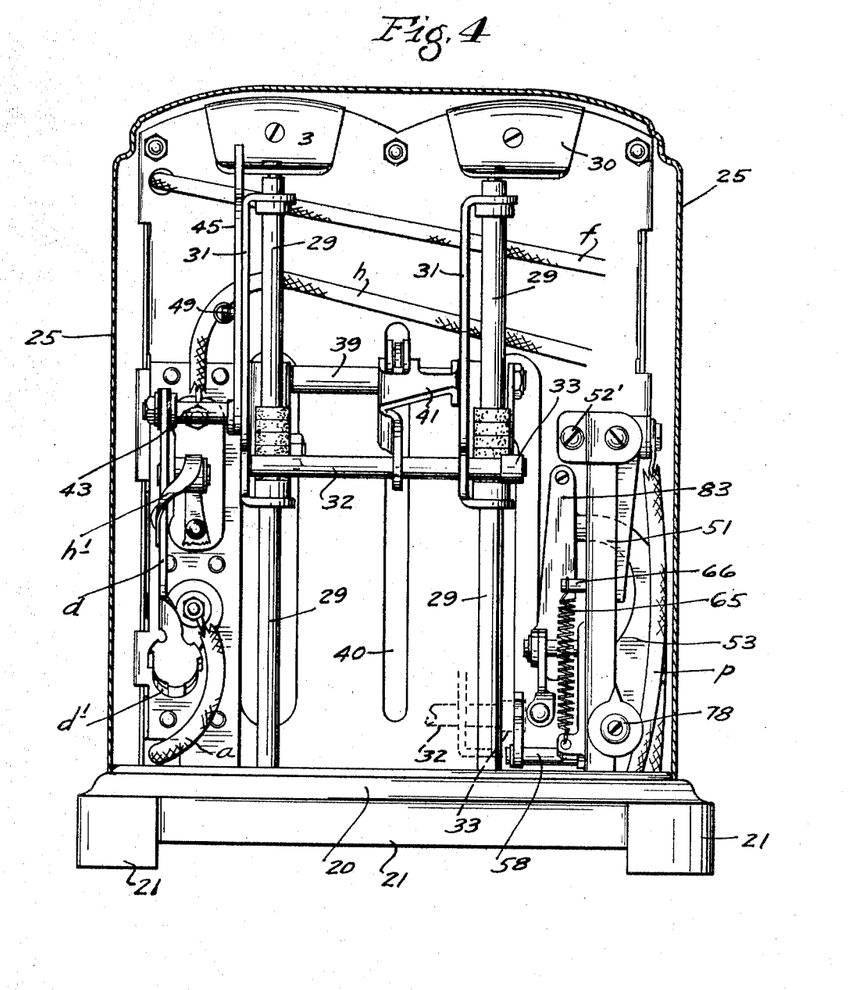
Fig. 4 is a front view of the toaster with the outside casing shown in section.

Mounted for vertical movements on the guide posts 29 is a so-called master switch actuator 25 which performs several additional functions hereinafter described. This so-called switch actuator for this duplex toaster includes a pair of brackets 31 that directly slide on the said posts and are rigidly tied together by a cross-rod 32 which, at one end, to wit: its right-hand end as viewed in Fig. 4, is equipped with a roller 33 for a purpose that will presently appear. The brackets 31 have rearwardly projecting arms that are rigidly secured to bread carriers in the form of skeletonized tables 34 that work one in each of the oven compartments between the laterally spaced heating elements or main coils $b$, see particularly Figs. 1, 2 and 3. The front ends of the tables 34 project through slots 35 in the front plate 22, see particularly Fig. 3.

Figure 1:
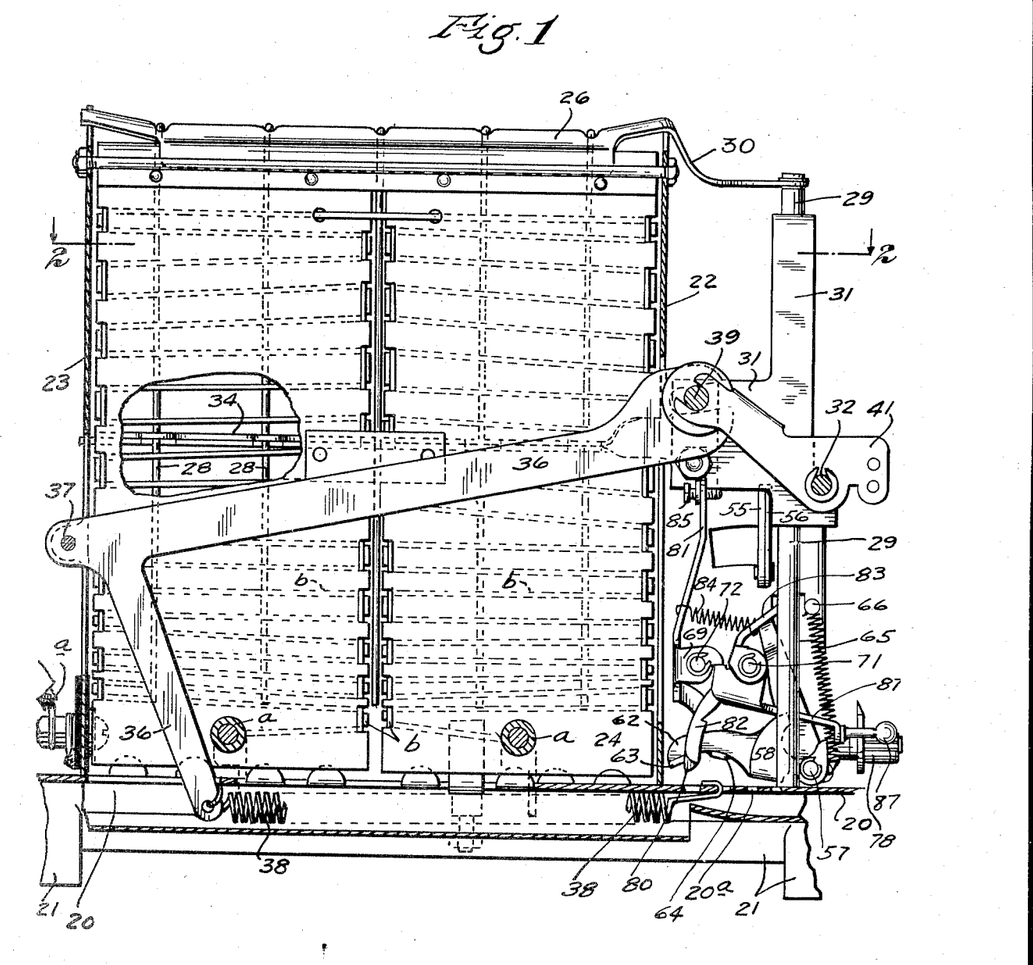
Fig. 1 is a vertical front to rear section through the toaster taken approximately on the line 1—1 of Fig. 2, the outside casing of the toaster being removed.

The vertically movable master switch actuator just above described is under yielding strain to move to an uppermost position, shown in Fig. 1, by suitable means which, as shown, involves a bell-crank lever 36 (best shown in Figs. 1 and 2) which is pivoted to a lug on the rear plate 23 at 37. The depending arm of this bell-crank is connected to a coiled spring 38, the front end of which is shown as adjustably anchored in any one of several perforations 20$a$ formed in the base plate 20. The long forwardly projecting upper arm of the bell-crank 36 is provided with a forked end that embraces a tie-rod 39 that co-operates with the cross-rod 32 to rigidly tie together the two brackets 31. The lever 36 is located between the two ovens and its front end works freely through a slot 40, see Fig. 4, in the front plate 22.

As a means for readily depressing the master switch actuator and parts carried therewith, there is provided a handle or hand-piece 41 which, as shown, is mounted on both of the tie-rods 32 and 39 so that in effect it is rigidly connected to the vertically movable actuator. In practice this hand-piece 41 will naturally be provided with a knob or front end portion that may be more readily gripped by the hand of the operator.

Figure 2:
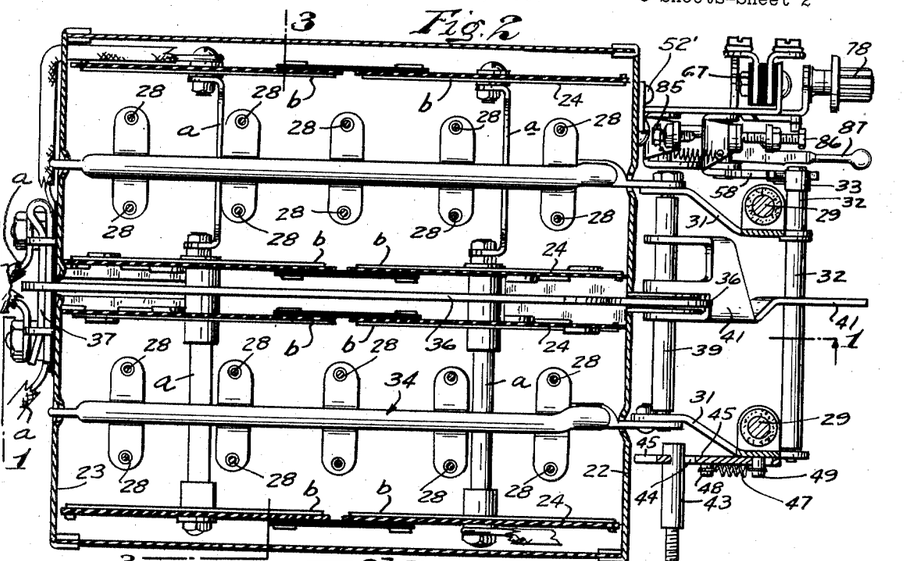
Fig. 2 is a horizontal section taken on the line 2—2 of Fig. 1.
Figure 3:
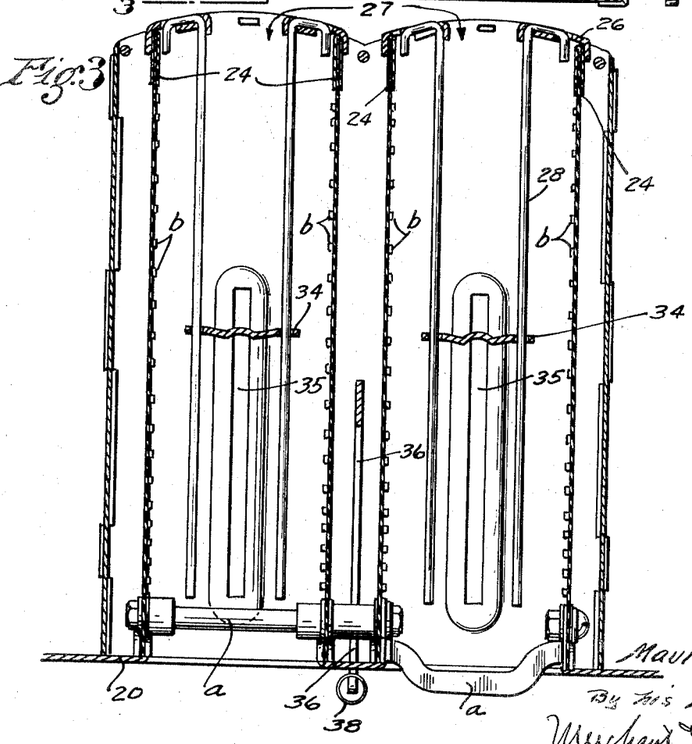
Fig. 3 is a transverse vertical section taken through the toaster on the line 3—3 of Fig. 2.
Figures 5, 15:
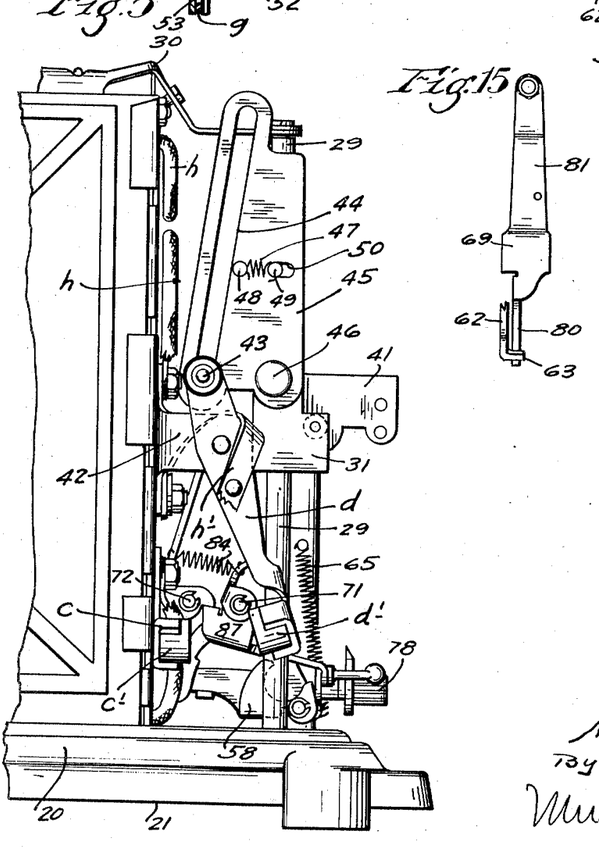
Fig. 5 is a right side elevation showing the front portion of the toaster, the rear portions thereof being broken away.
Figs. 15 and 16 are views looking from the left toward the right in respect to Figs. 13 and 14 and showing, respectively, the primary and secondary detent latches.

Attention is now directed particularly to Figs. 4 and 5 wherein it will be noted that the pivoted member $d$ of the master switch is directly pivoted to a lug 42 on the front plate 22 and at its upper end is provided with an electrically insulated laterally projecting cam pin 43 which, in Fig. 2, is shown detached from said switch lever. This pin 43 works in the oblique cam groove 44 of a cam plate 45 which, as shown, is pivoted to the left-hand bracket 31 of the master switch actuator at 46. Normally, cam plate 45 is held in the position shown in Fig. 5 under the action of a light coiled spring 47 attached to a pin 48 on said plate and on a pin 49 on bracket 31, said plate 45 having a slot 50 that co-operates with pin 49 to limit the oscillatory movements of said cam plate 45.

Also, it will be noted that the master switch elements $c$—$d$ at their engaging ends, are shown as provided with carbon contacts $c'$ and $d'$. Directing further attention to Fig. 5, it is important to further note that the wire $h$ of diagram Fig. 17 is connected to the metallic lug 42; that said lug 42 is insulated from the front plate 22; and that said lug or the base thereof is directly electrically connected to switch lever $d$ by a very flexible ribbon-like conducting element $h$ which, together with lug 42, constitute a part of the electrical connection designated by the character $h$ in Fig. 17.

*Operation of above described elements*

At this time it is desirable only to particularly note the following actions, to wit: normally, master switch actuator will be in its elevated position; the bread-carrying tables 34 will be raised; and the master switch elements $c$—$d$ will be separated and the master switch opened so that no current can then be supplied to any part of the toaster. When, however, this master switch actuator is depressed, the master switch $c$—$d$ will be closed and the bread tables will be lowered so as to carry the bread slices into position for toasting. Automatic means is provided for latching the master switch actuator in its lowered position with the bread tables lowered and the master switch closed; and this is a matter which will next be disclosed and discussed. Before proceeding, however, it may be stated that the projecting end of the cross-bar 32 which, in the form of device illustrated, ties together the brackets 31 of the so-called master switch actuator, affords one and most convenient form of latch element for co-operation with a so-called master detent to lock the bread tables depressed and the master switch closed when the master switch actuator is depressed.

Figure 6:
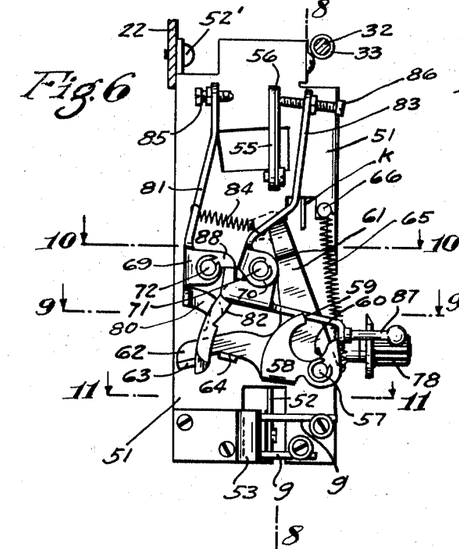
Fig. 6 is a view looking from the left toward the right and showing the control unit or assembly of the toaster removed from the toaster proper.
Figure 7:
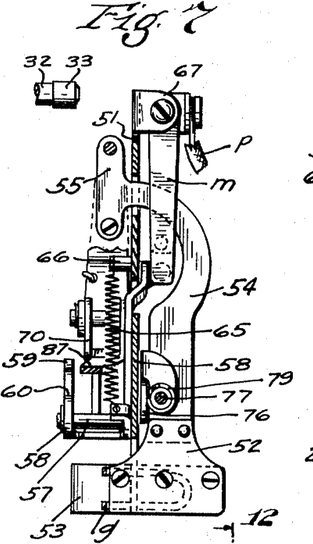
Fig. 7 is a view looking from right toward the left at the parts shown in Fig. 6, some portions being sectioned.
Figure 13:
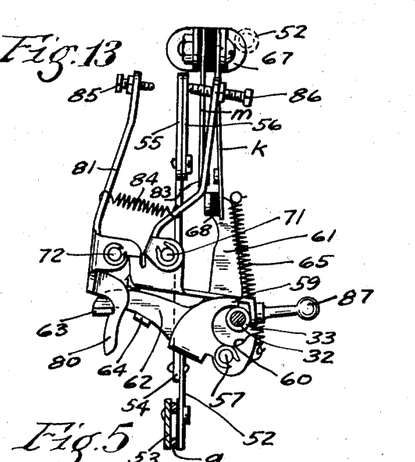
Figs. 13 and 14 are views corresponding generally to Fig. 6, but illustrating different positions of the control elements and some parts being sectioned and others being removed.
Figure 14:
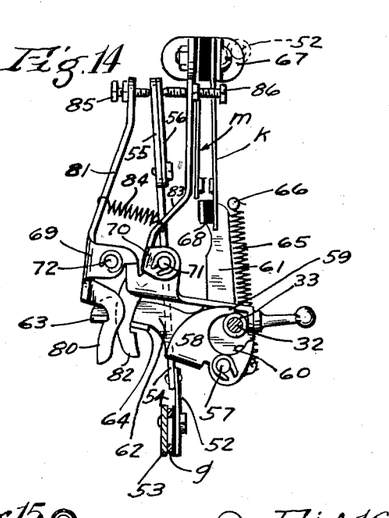
Figure 16:
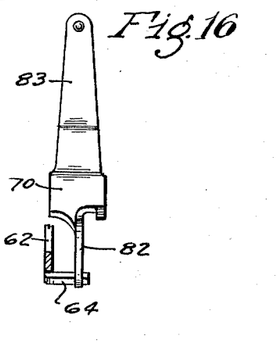

This latch element 32, hereinafter for distinction designated as the "detent tappet," is shown in Figs. 1, 2 and 4, but attention is particularly called to the positions thereof shown in Figs. 6, 7, 13 and 14. In Figs. 6 and 7 this detent tappet is shown in the position it occupies when the bread tables or carriers are elevated and the master switch is open. Figs. 13 and 14 show the position said detent tappet will occupy when the master switch actuator and the bread tables are lowered and the master switch is closed.

*Self contained control unit*

As indicated in the introduction to this specification, the elements that constitute the control mechanism are mounted, as a self-contained structure, on an independent frame 51 that is supplemental to or distinct from the main framework of the toaster. This supplemental frame 51, see particularly Figs. 1, 2 and 6 to 14, inclusive, is shown as of channel form and is rigidly but detachably secured to the front plate 22 of the toaster proper by suitable means, such as machine screws 52' passed through the inner flanges thereof and screwed into the front plate 22.

Mounted on this detachable frame 51 are the following elements, to wit: the master detent, primary and secondary latches for said master detent, and a thermally responsive control element that operates on the primary and secondary latches to control the time interval of the toasting action.

Figure 8:
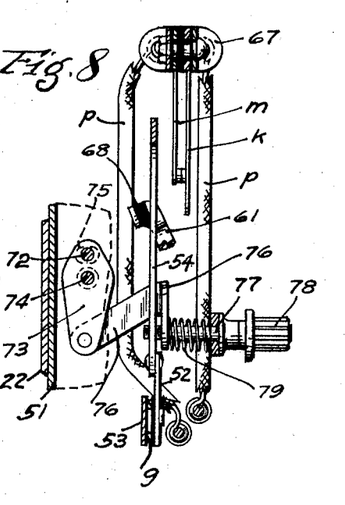
Fig. 8 is a section taken on the irregular line 8—8 of Fig. 6.
Figure 9:
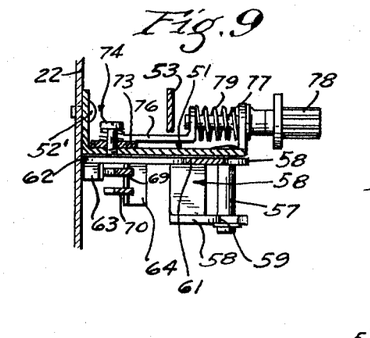
Fig. 9 is a section taken on the line 9—9 of Fig. 6.
Figure 10:
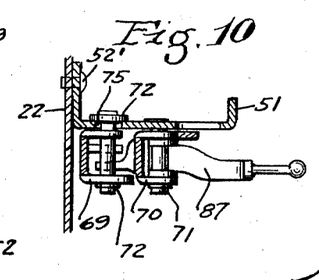
Fig. 10 is a section taken on the line 10—10 of Fig. 6.
Figure 11:
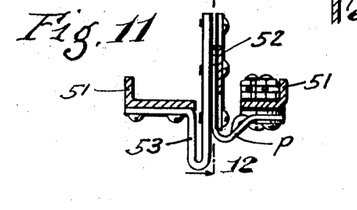
Fig. 11 is a section taken on the line 11—11 of Fig. 6.
Figure 12:
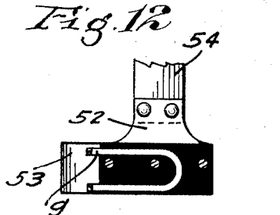
Fig. 12 is a section taken approximately on the line 12—12 of Fig. 11.

The thermally responsive element is a warp bar, the active portion of which is a bi-metallic strip or element; and also mounted on the supplemental frame and closely associated with the bi-metallic element or portion of the warp bar is the heretofore noted minor or secondary heating element $g$, see particularly Figs. 8 and 12, in addition to the diagram view Fig. 17. The warp bar noted may take various forms but, as shown, involves a bi-metallic strip 52. The said secondary heating element $g$ is electrically insulated from said strip 52 and from a bracket 53 which, in turn, is attached to and extends through an opening in the supplemental frame 51, as best shown in Fig. 11. The warp bar, the expansible and contractible element of which is afforded by the bi-metallic base strip 52 is, in this preferred structure, completed by a non-warping metallic extension 54, the upper free end of which projects through an opening in the vertical plate of the frame 51 and terminates in a head 55, see particularly Figs. 6 and 7. For a minor or secondary purpose, which will hereinafter appear, the head 55 is preferably and, as shown, provided with a bi-metallic plate 56 attached to said head at one end and free at the other. Here, it should be stated, that the wires $f$, $h$ and $p$ are insulated from the metallic parts of the toaster, except at the places described and generally indicated in the diagram view, Fig. 17.

When the secondary frame 51 is applied as described, the parts thereof are brought into a definite relation in respect to the projecting end of the shaft or pin 32 which part is herein designated as the detent tappet. The normal or elevated position of the tappet is best shown in Figs. 4, 6 and 7, and the depressed position thereof is best shown in Figs. 13 and 14.

Pivoted to the frame 51 at 57 is a device that performs several functions and is herein designated as the master detent and is indicated as an entirety by the numeral 58. This master detent, for the performance of the several functions hereinafter described, is provided with a lock lug 59, a setting lug or cam surface 60, a shunt switch actuating arm 61, and a latch arm 62, which latter is provided with laterally projecting latch lugs 63 and 64, see particularly Figs. 6 and 9. This master detent, as an entirety, is normally in the position shown in Fig. 6, being there yieldingly held against movement in a clockwise direction by a coiled spring 65 attached thereto and to a pin 66 on the frame 51. In this normal position of the master detent the arm 61 is out of engagement with the movable contact $k$ of the shunting switch $k$—$m$.

By reference particularly to Figs. 13 and 14, it will be noted that the contacts $k$—$m$ of the shunting switch are insulated from but supported by lugs 67 secured on the frame 51. It may also be stated that the contact $k$ is under its own spring tension tending to engage it with the contact $m$. Further, it may be noted that the free end of the arm 61 is provided with an insulating block 68 that directly engages with the free end of contact $k$.

Mounted also directly or indirectly on the frame 51 is a primary detent latch 69 and a secondary detent latch 70. Latch 70 is pivoted on a stud 71 and is rigidly secured on the frame 51, while the primary latch 69 is directly pivoted on a stud 72 which, except for an important secondary function, might also be rigid on said frame but which, for the performance of the secondary function, is secured to the upper end of a lever 73, see particularly Figs. 8 and 9, which, in turn, is pivoted to said frame 51 at 74. By reference to Fig. 10 it will be noted that the base of stud 72 works through a large opening or slot 75 in said frame. The lower end of lever 73 is connected to one end of a link 76, the depending arm of which has threaded engagement with an adjusting screw 77 in one flange of the frame 51 and is provided at its projecting end with an operating knob 78, as best shown in Fig. 8. The projecting end of the screw 77, as indicated, works with screw-threaded engagement through the adjacent end of link 76. A spring 79 is shown as interposed between the adjacent end of the link and the side flange of frame 51 so as to press the lower end of link 73 as far toward the left as permitted by adjustment of the screws 77.

The primary latch 69 is provided with a depending notched latch lug 80 and with an upwardly projecting arm 81; while the secondary latch 70 is provided with a depending notched latch lug 82 and with an upwardly projecting arm 83. The two arms 81 and 83 are connected by a light coiled spring 84. At its upper end the arm 81 is provided with an adjustable element in the form of a tappet screw 85 and the upper end of arm 83 is provided with an adjustable tappet screw 86. Here it may be noted that the head 55 of the warp bar works between and is alternately engageable with the tappets 85 and 86 of the arms 81 and 83. By reference particularly to Fig. 14, it will be noted that the notch in lug or arm 82 of secondary latch 70 extends slightly lower than the notch in lug or arm 80 of primary latch 69.

The exact relation of the various elements just described will more fully appear in the description of the operation, but it may be here stated that the notched latch lug 80 of latch 69 operates on the lug 63, while the notched tappet lug 82 of secondary latch 70 acts upon lug 64 of the arm 62 of the master detent.

As a manual trip for terminating the toasting action, at will, there is provided a trip lever 87 shown as pivoted on the stud 71 and having a short end that is operative on a lug 88 of the primary latch 69.

*Summary of operation*

Normally, or in the dormant condition of the toasting apparatus, the various parts will be in positions best shown in Figs. 1, 5, 6 and 7, by reference to which it will be noted that the master switch actuator, the bread tables or carriers are raised, and the master switch is then open. To start the toaster in operation, the handle 41 is engaged and by downward pressure the master switch actuator is forced downward to its limit. This downward movement of the master switch actuator performs three important functions, to wit: it moves the bread tables or carriers downward so as to move the bread into toasting position, it closes the master switch, and it moves the tappet detent 32 down to the lowered position best shown in Fig. 13, in fact, to a slightly lower position than shown in said view. When said tappet is moved to the extreme lowered position, while the master detent is still in the position shown in Fig. 6, it engages the cam surface 60 of lock lug 59 and with a camming action thereon forces the master detent to turn in a clockwise direction, in respect to Fig. 6, thereby accomplishing two immediate actions, to wit: it causes the arm 61 to engage the shunt switch contact k and thereby open the shunt switch, and it also carries the arm 62 to an extreme upper position where its lug 63 will be engaged and held by the notch of arm 80 of primary detent latch 69, which latter is then subject to spring 84. This movement of the master detent in the clockwise direction just stated carries the lock lug 59 over the detent tappet 32 and thereby locks the master switch actuator in its lowered position with the bread tables lowered and the master switch closed. The closing of the master switch, as already described, was produced by the action of the slot 44 of cam plate 45.

The operation just above described closes the supply circuit not only through the main heating coils b but also through the minor or shunt circuit controlling heating element g. The closing of the circuit through the main heating coils b, of course, starts the toasting action and the starting of the current through the minor heating element g, (the shunt switch k—m being then open), heats the bi-metallic element 52 and causes it to move toward the left in respect to Fig. 6, for example. As the head 55 of this warp bar moves toward the left from normal position, for example, shown in Fig. 13, it will continue that movement until said head strikes the tappet screw 85 of primary detent latch and causes the notched arm 80 to release itself from the lug 63 of the detent arm 62. When arm 62 is thus released, the master detent will make a very slight rotary movement in a counter-clockwise direction under the tension of spring 65, but its movement in that direction will be intercepted by the notched arm 82 of secondary latch 70 which, at that time, under the release from head 55 and under the action of spring 84, will have come in a position to engage lug 64 of detent arm 62.

This movement in the counter-clockwise direction of the master detent will be just sufficient to cause arm 61 to permit the shunt switch m—k to close, but will not be sufficient to cause lock lug 59 to release the detent tappet 32. Hence, at this time, the bread carriers will still be held down and the master switch will remain closed so that the heating coil b will still be energized by the supply of current; but the closing of the shunt switch k—m will shunt the current around the minor heating element g, in effect, practically cutting the same out of action, so that the bi-metallic element 52 will immediately begin to cool and the warp bar to move toward the right or toward its normal position.

When the warp bar closely approaches or reaches its normal position toward the right, its head 55, acting on screw 86 of arm 83 through bimetallic element 56, will cause notched arm 82 of the secondary latch 70 to disengage lug 64 of detent arm 62, whereupon, under the action of spring 65, the master detent will be moved in a counter-clockwise direction so as to release detent tappet 32. When detent tappet 32 is released from lug 59, the spring 38 will immediately become active to move the master switch actuator and bread tables or carriers 34 to their uppermost position, thereby opening the master switch and cutting off the entire supply of current to the toaster. This, of course, terminates the toasting action of that interval.

Looking back over the above statements, it will be evident that the first sub-interval of the toasting action took place while the warp bar was moving in a counter-clockwise direction or toward the left far enough to cause the primary latch to release the master detent for that slight movement required to close the shunt switch $k-m$, and that the second sub-interval took place while the warp bar was moving in a clockwise direction or toward the right up until the time that the secondary latch operated to release the master switch actuator for opening of the master switch and movement of the bread carriers or tables to upper or discharging positions.

If, before the automatic toasting interval has been completed, stopping of the toasting action should be desired, that may be accomplished simply by pressing down on the trip lever 87 which causes the primary detent latch to release the master detent at a time when the secondary latch is not in position to intercept the movement of said master detent.

It may be stated that the automatic cooking or toasting interval, which is under the automatic control of the devices described, may be varied so as to toast the bread lighter or darker simply by turning of the knob 78 which, through the link 76 and pivoted arm 73, moves the stud 72 that supports the primary detent latch, either toward the right or toward the left, in respect to Figs. 6, 8, 13 and 14. Movement of the said stud 72 toward the left increases the length of the toasting interval, while movement of said stud toward the right decreases the length of the toasting interval.

There is one other minor feature that may be noted, to wit: the action of the bi-metallic element 56 on the head 55 of the warp bar. This element 56, as the temperature of the toasting apparatus increases, will warp slightly away from the head 55, thereby, to a certain degree, shortening the second sub-interval by decreasing the extent of the return movement of said head 55 toward the right required to release the secondary detent latch and thereby terminating the toasting action.

From the foregoing, it is evident that the apparatus described is capable of a large range of modifications within the scope of the invention herein disclosed and claimed. Various elements of the apparatus have, as a matter of necessity and for definiteness in following the description, been given certain names such, for example, as master circuit actuator, master detent, primary and secondary detent latches and warp bar or thermally responsive element, but, of course, it should be understood that devices that perform same or similar functions are covered thereby regardless of the names that may be given thereto. Also, it will be understood that while the device is herein designated as a bread toaster, that certain of the features may be employed in various other cooking apparatus.

What I claim is:

1. A toaster comprising in combination, an electric heating element, a control switch for the heating element biased to its open position, a latch for holding the switch in its closed position, a bimetal element, manually-actuable means for closing the switch and for effecting thermal energization of the bimetal element to cause it to warp in one direction, means actuated by the bimetal element in its travel in said one direction to effect thermal deenergization of the bimetal element and cause it to warp in the other direction and means operatively engaged by the bimetal element during its travel in the other direction and co-operating therewith to effect release of the latch and opening of the switch.

2. In combination, heat treating apparatus, of the type adapted to be used in carrying out a plurality of heat treatments in rapid succession, a main heater therefor, a heat responsive element in the form of a bimetallic warp-acting thermostat, an electric heater for said element, a circuit for said heater closed concurrently with institution of the heat treatment, means controlled by the element responsive to heating thereof for terminating the heating of said thermostatic element, and means controlled by the cooling of said thermostatic element for rendering said main heater inoperative.

3. In a bread toaster, a toasting compartment for receiving slices of bread to be toasted, a heat responsive element including a bimetallic warp-acting thermostat that changes its position and returns responsive to heating and cooling of the element, means for rapidly heating said element at the beginning of the toasting period, thereby warping said bimetallic element in one direction to terminate the heating of the latter, and means for terminating the toasting period responsive to warping of said bimetallic element in the opposite direction when it cools.

4. The combination with cooking means including a primary heater and associated holder for the article to be cooked, of a timer for establishing intervals of time action of said primary heater, said timer including a warp-acting bi-metallic thermally responsive member, heating means operative on said timer member only until the latter has reached a predetermined high temperature and warped in one direction to a predetermined extent, thereby permitting said member to cool while the first noted heater is still in action, and means for interrupting the action of said first noted heater when said timer member has cooled and warped to a predetermined extent in the opposite direction.

5. The combination with electrical cooking means including a primary electrical heater and associated holder for the article to be cooked, of a thermostatic timer for establishing intervals of time action of said primary heater, said timer including a warp-acting bimetallic thermally responsive member and an associated secondary electrical heater, a shunting switch actuated by said thermally responsive member, circuit connections and associated means operatively arranged to cut said secondary heater out of action when said bimetallic member has been heated and warped to a predetermined extent, and means for interrupting the action of said primary heater when said bimetallic member has cooled and warped in the opposite direction to a predetermined extent.

6. The combination with cooking means including a primary heater and associated holder for the article to be cooked, of a thermostatic timer for establishing intervals of time action of said primary heater, comprising a warp-acting bimetallic thermally responsive member, means for heating said bimetallic member simultaneously with the heating of the primary heater, means operative as a result of subsequent heating and warping of said bimetallic member in one direction for rendering the thermally responsive heating means inoperative on the thermally responsive member, and means operative as a result of subsequent cooling and warping in the opposite direction of said bimetallic member, for indicating the termination of the cooking interval, by an observable manipulation of the device.

7. The combination with cooking means including a primary heater and an associated holder for the material to be cooked, of a warp-acting bimetallic thermally responsive timer element, means for supplying heat to said timer element simultaneously with the application of heat to said primary heater, and co-operating control devices for terminating the time cooking interval, by two sub-intervals, the first of which is operated by the heating and warping of the bimetallic element in one direction and the second of which is operated by a cooling and warping in the opposite direction of said bimetallic member, and which cooling and latter noted warping action of said bimetallic element terminates the application of heat to said primary heater.

8. The combination with cooking means including a primary electrical heat radiator and an associated holder for the article to be cooked, of a warp-acting bimetallic thermally responsive timer member, a secondary electrical heat radiator associated with said bimetallic timer member, circuit connections to said electrical heat radiator including a manually closed master switch and a switch subject to the warping action of said bimetallic member and thereby operative to cut said secondary electrical heat radiator out of action on said bimetallic member, when the latter has been heated and warped to a predetermined extent in one direction, and operative to open said master switch and terminate the cooking interval when said thermally responsive member is cooled and warped in the opposite direction to a predetermined extent.

9. The combination with cooking means, of a timer for establishing intervals of the cooking action including a warp-acting bimetallic thermally responsive member, heating means operative on said timer member only until the latter has reached a predetermined high temperature and warped to a predetermined extent in one direction, thereby permitting the timer member to cool while the cooking action is continued, and means for interrupting the cooking action when said thermally responsive timer member has cooled and warped to a predetermined extent in the opposite direction.

10. In a toaster, major electric heat radiators; a supply circuit therefor including a master switch; a bread carrier; a master switch actuator having connections for moving said bread carrier; means tending to open said master switch and move said bread carrier to discharge position; a movable master detent, operative in one position to hold said master switch closed and said bread carrier in bread toasting position; primary and secondary master switch latches, the former operated to hold said master detent in position to hold said master switch closed; a minor electric heating element; a shunt circuit including said minor heating element and a shunting switch, connected across the supply circuit; said master detent being operative on said shunt switch to hold the same open while subject to said primary latch, said secondary latch being operative on said master detent to permit said master detent to move and close said shunting switch, while said master detent is still holding said master switch closed, and a thermally responsive bimetallic element subject to said minor electric heating element and operative while said shunting switch is open to cause said bimetallic warp bar to move in one direction, to release said primary latch, and operative on the return movement in the opposite direction, to release said secondary latch, thereby terminating the toasting action.

11. The structure defined in claim 10 in which said master detent, primary and secondary latches, minor electric heating element and thermally responsive bimetallic elements are all mounted on a supplemental frame that is detachably secured to the main frame of the toaster and are brought to operative positions by the application of said supplemental and said main frame.

12. The structure defined in claim 10 in which said master detent, primary and secondary latches, minor electric heating element and thermally responsive bimetallic elements are all mounted on a supplemental frame that is detachably secured to the main frame of the toaster and are brought to operative positions by the application of said supplemental and said main frame, and in further combination with a detent tappet movable from a normal position to an operative position when said master switch is closed and when thus moved operative on said master detent to set the latter in a position to lock said tappet and thereby hold the master switch closed.

13. In a cooking device of the type adapted to be used in carrying out a plurality of successive cooking actions, a timer for establishing intervals of the cooking action including a thermally responsive member, a heater for heating said member thereby to cause movement thereof, means for instituting operation of said heater upon institution of a cooking interval, and means responsive to heating movement of said thermally responsive device for rendering said heater inoperative thereby to permit the thermally responsive member to cool, said means being mechanical and operated by the force of the thermally responsive device; and means responsive to cooling movement of said thermally responsive member after said heater is rendered inoperative for interrupting the cooking action of said device.

14. A cooking device as set forth in claim 13 wherein the means responsive to cooling movement of the thermally responsive member for interrupting the cooking action are mechanical and operated by the force of the thermally responsive member upon cooling.

15. A device as set forth in claim 3 and including an auxiliary bimetal bar supported by said bimetal element and responsive to increase of toaster temperature for causing a lesser amount of warpage of the bimetal element in said opposite direction to effect release of the latch.

16. A device as set forth in claim 8 and including an auxiliary bimetal bar supported by said bimetallic timer member and responsive to increase of toaster temperature for causing a lesser warpage of the bimetallic timer member in the opposite direction to terminate a cooking interval thereby shortening the duration of a cooking interval with rise of temperature of the cooking means.

17. In a bread toaster, a toasting compartment for receiving slices of bread to be toasted, a heat responsive element including a main bimetallic warp-acting thermostat that changes its position and returns responsive to heating and cooling of the element, means for rapidly heating said element at the beginning of the toasting period, thereby warping said bimetallic element in one direction to terminate the heating of the latter, a second bimetallic element supported by said bimetallic warp-acting thermostat and responsive to toaster temperature, and means for terminating the toasting period responsive to warping of said main bimetallic thermostat in the opposite direction when it cools and to the warping of the second bimetallic element as it is heated by the toaster.

18. In a cooking device of the type adapted to be used in carrying out a plurality of successive cooking actions, a thermally responsive member, a heater for heating said member thereby to cause movement thereof, manually operable means biased to inoperative position for simultaneously instituting a cooking operation and instituting operation of said heater thereby to cause movement of said thermally responsive member, a first detent for maintaining said cooker in operation during heating of said thermally responsive device by said heater, means responsive to heating movement of the thermally responsive device for deenergizing said heater and releasing said first detent, a second detent for maintaining said cooker in operation during subsequent cooling of said thermally responsive device, and means responsive to cooling movement of the thermally responsive device for releasing said second detent thereby to terminate the cooking operation.

19. In a toaster, the combination with an electric heating element, a movable bread slice support, spring means operative to urge said slice support to non-toasting position, a latch for restraining the spring means so that the slice support may rest in toasting position, and manual means for moving the slice support into toasting position, which movement actuates the latch to restrain the spring means, of means including a bimetal element to effect release of the latch, means whereby actuation of the manual means effects thermal energization of the bimetal element and movement of one part thereof in one direction, means mechanically actuated by the bimetal element by its movement in one direction to effect thermal deenergization of the bimetal element and cause it to move in the opposite direction and means operatively engaged by the bimetal element during its movement in the opposite direction and cooperating therewith to effect release of the latch and return of the bread slice support to non-toasting position.

20. In a bread toaster, a toasting compartment, a slice carrier movable to toasting and non-toasting positions relative to said compartment, means for retaining said carrier in toasting position, a bimetallic strip, and releasing means for said carrier responsive to flexing and unflexing of said strip by heating and cooling of the same.

21. In a timer, a bimetallic strip secured at one end and having the other end free to move, means for moving and returning said free end by heating and cooling the strip, and adjusting means for shifting up and down the temperature range to which the movement and return of said strip is responsive.

22. In an electric toaster, in combination, an electric heating element, a control switch therefor, a movable bread slice support, a single means biasing the control switch to open position and the bread slice support to non-toasting position, a latch for holding the switch in closed position and the bread slice support in toasting position, a thermally-actuable latch-releasing means including an auxiliary electric heater, and a single means for closing said switch, moving the support into toasting position, moving the latch into holding position and effecting energization of the auxiliary heater.

23. In a toaster, major electric heat radiators, a supply circuit therefor including a master switch, and means for controlling the toasting interval, including a master detent operative in one position to hold said master switch closed, but movable to a position to release the same for opening movement, primary and secondary master detent latches operative in the order named to terminate the toasting action by a two-step interval, a detent tappet movable from a normal to an operative position when the master switch is closed, and when thus moved operative on said master detent to set the latter in a position to lock said tappet and thereby hold said master switch closed, and a thermally responsive device operative at the termination of the first step of the toasting interval to release said master detent from said primary latch and subject the same to said secondary latch and operative at the termination of the second toasting interval to release said master detent from said secondary latch and thereby terminate the complete toasting interval.

MAURICE H. GRAHAM.